(12) United States Patent
Mills

(10) Patent No.: X6946
(45) Date of Patent: Feb. 27, 1832

(54) HATS, WATERPROOF

(76) Inventor: Robert Mills

Richard Mills Baltimore Maryland

Letters Patent

The Schedule referred to in these Letters Patent and making part of the same containing a description in the words of the said Richard Mills himself of his improvement in Manufacturing Water Proof Hats To all whom these Presents shall come Be it known that I Richard Mills of Baltimore City in the State of Maryland have invented a new and useful improvement in the manufacturing of Hats & the following is a full & exact description of the construction & operation of the said Machine as invented & improved by me A Composition of Matter for the purpose of stiffening the body or foundation composed of Wool and Fur mixed together and sized in until it [illegible] the felt that is necessary the stiffening is then applied and rubbed in with a hard brush until the foundation is stiff enough to receive the teeth which consist of brass or copper wire, the teeth are put through the foundation which is nailed or tacked on a back with a short handle made of wood of any kind the articles that compose this Composition or matter are as follows The whites of Hens Geese Turkeys Ducks & Guinea fowls Eggs mixed with oyster shell and stone lime being composed of half of each which when done is called a [illegible] water proof raising and used in the manufacturing Water proof Hats.

Witnesses
Henry W Gray
Walter C Gray

Richard Mills

Copy [illegible]

232 [illegible]